(12) United States Patent
Foote

(10) Patent No.: US 7,195,382 B1
(45) Date of Patent: Mar. 27, 2007

(54) VEHICLE MIRROR WITH SECONDARY LIGHTING LENS FOR GROUND ILLUMINATOR

(75) Inventor: Keith D. Foote, Kentwood, MI (US)

(73) Assignee: Magna Donnelly Mirrors North America, L.L.C., Kentwood, MI (US)

(*) Notice: Subject to any disclaimer, the term of this patent is extended or adjusted under 35 U.S.C. 154(b) by 77 days.

(21) Appl. No.: 11/160,614

(22) Filed: Jun. 30, 2005

Related U.S. Application Data

(60) Provisional application No. 60/521,762, filed on Jun. 30, 2004.

(51) Int. Cl.
*B60Q 1/26* (2006.01)

(52) U.S. Cl. ............... 362/494; 362/545; 362/543

(58) Field of Classification Search ........... 362/494
See application file for complete search history.

(56) References Cited

U.S. PATENT DOCUMENTS

| | | | |
|---|---|---|---|
| 3,596,079 A | 7/1971 | Clarke | |
| 4,809,137 A | 2/1989 | Yamada | |
| 4,821,019 A | 4/1989 | Taylor | |
| 4,890,907 A * | 1/1990 | Vu et al. | 359/843 |
| 4,916,430 A | 4/1990 | Vu et al. | |
| 5,017,903 A * | 5/1991 | Krippelz, Sr. | 340/472 |
| 5,371,659 A | 12/1994 | Pastrick et al. | |
| 5,497,306 A * | 3/1996 | Pastrick | 362/494 |
| 5,624,176 A | 4/1997 | O'Farrell et al. | |
| 5,669,699 A | 9/1997 | Pastrick et al. | |
| 5,669,704 A | 9/1997 | Pastrick | |
| 5,669,705 A | 9/1997 | Pastrick et al. | |
| 5,788,357 A | 8/1998 | Muth et al. | |
| 5,823,654 A | 10/1998 | Pastrick et al. | |
| 5,863,116 A | 1/1999 | Pastrick et al. | |
| 5,871,275 A | 2/1999 | O'Farrell et al. | |
| 5,879,074 A | 3/1999 | Pastrick | |
| 6,045,243 A | 4/2000 | Muth et al. | |
| 6,074,077 A | 6/2000 | Pastrick et al. | |
| 6,086,229 A | 7/2000 | Pastrick | |
| 6,099,155 A | 8/2000 | Pastrick et al. | |
| 6,132,072 A | 10/2000 | Turnbull et al. | |
| 6,149,287 A | 11/2000 | Pastrick et al. | |
| 6,152,587 A | 11/2000 | Berg | |
| 6,152,590 A | 11/2000 | Furst et al. | |
| 6,176,602 B1 | 1/2001 | Pastrick et al. | |
| 6,200,010 B1 | 3/2001 | Anders | |
| 6,227,689 B1 | 5/2001 | Miller | |
| 6,257,746 B1 | 7/2001 | Todd et al. | |

(Continued)

FOREIGN PATENT DOCUMENTS

DE        3635473 A1      4/1998

(Continued)

*Primary Examiner*—Ali Alavi
*Assistant Examiner*—Hargobind S. Sawhney
(74) *Attorney, Agent, or Firm*—McGarry Bair PC

(57) ABSTRACT

A ground illuminator for an external vehicle rearview mirror comprises an electrical light bulb installed in a housing having a transparent primary lens. A secondary lens it is interposed between the housing and the primary lens, and is spaced from the primary lens. The spacing between the lenses reduces the thermal conductivity between the lenses and provides a channel for airflow between the lenses, thereby minimizing the temperature of the primary lens due to illumination of the light bulb.

18 Claims, 6 Drawing Sheets

U.S. PATENT DOCUMENTS

| | | |
|---|---|---|
| 6,264,353 B1 * | 7/2001 | Caraher et al. ............. 362/494 |
| 6,276,821 B1 | 8/2001 | Pastrick et al. |
| 6,280,069 B1 | 8/2001 | Pastrick et al. |
| 6,296,379 B1 | 10/2001 | Pastrick |
| 6,299,333 B1 | 10/2001 | Pastrick et al. |
| 6,416,208 B2 | 7/2002 | Pastrick et al. |
| 6,474,853 B2 | 11/2002 | Pastrick et al. |
| 6,616,313 B2 * | 9/2003 | Furst et al. ................. 362/494 |
| 6,637,917 B2 * | 10/2003 | Schwanz et al. ............ 362/487 |
| 6,685,348 B2 | 2/2004 | Pastrick et al. |
| 6,848,816 B2 | 2/2005 | Gilbert et al. |
| 2001/0036081 A1 | 11/2001 | Gilbert et al. |
| 2003/0227779 A1 | 12/2003 | Boddy et al. |
| 2004/0114384 A1 * | 6/2004 | Carter et al. ................ 362/494 |
| 2006/0133101 A1 * | 6/2006 | Furtwangler ................ 362/494 |

FOREIGN PATENT DOCUMENTS

| | | |
|---|---|---|
| GB | 2 265 329 A | 9/1993 |
| WO | WO 81/02871 | 10/1981 |
| WO | WO 95/31354 | 11/1995 |
| WO | WO 01/28812 A1 | 4/2001 |
| WO | WO 01/92059 A2 | 12/2001 |

* cited by examiner

VEHICLE MIRROR WITH SECONDARY LIGHTING LENS FOR GROUND ILLUMINATOR

CROSS-REFERENCE TO RELATED APPLICATION

This application claims the benefit of U.S. provisional application Ser. No. 60/521,762, filed Jun. 30, 2004, which is incorporated herein in its entirety.

FIELD OF THE INVENTION

The invention relates generally to area lights for vehicle rearview mirrors, and more particularly to a secondary lens for an area light for reducing the temperature of a primary lens caused by the illumination of a light bulb.

DESCRIPTION OF THE RELATED ART

External rearview mirrors are ubiquitous for motor vehicles. Conventional external rearview mirrors are increasingly incorporating additional functionality, such as area lights, also known as ground illuminators or pot lights. U.S. Pat. Nos. 5,371,659, 5,823,654, 6,074,077, and 6,149,287 disclose rearview mirrors incorporating area lights for illuminating the area adjacent a vehicle.

The ground illuminator is typically utilized on rearview mirrors as a safety feature, and comprises an incandescent light bulb in a housing having a lens for protecting the bulb and modulating the illumination from the light bulb. The ground illuminator is activated by operating a control device, which is frequently incorporated into a special key fob, and illuminates a region around the front and rear vehicle doors on both the passenger and driver sides. A certain intensity of illumination is desirable to ensure the usefulness of the system. For example, Ford Motor Company suggests 1.5 lux over a 600×1200 mm target.

The intensity of illumination at ground level is a function of the distance of the ground illuminator above ground level. On large vehicles, such as pickup trucks and SUVs, this distance is relatively great. Therefore, a more powerful light source is required to achieve the required illumination. This increased power causes more heat to be generated by the light bulb, which is transferred to the lens. In a large vehicle application, the temperature of the ground illuminator lens can exceed 115° C. Because the ground illuminator lens is typically coextensive with the mirror housing and is therefore accessible, contact with the lens is likely and, at high temperatures, can result in a person suffering burns.

One solution to this problem is to use light emitting diodes (LEDs) in place of the incandescent bulb. However, the light emitting diodes that would be required to provide illumination equivalent to that provided by an incandescent bulb are far more costly than an incandescent bulb.

SUMMARY OF THE INVENTION

A ground illuminator for an external vehicle rearview mirror comprises an electrical light bulb installed in a housing having a transparent primary lens. A secondary lens is interposed between the housing and the primary lens, and is spaced from the primary lens. The spacing between the lenses reduces the thermal conductivity between the lenses and provides a channel for airflow between the lenses, thereby minimizing the temperature of the primary lens due to illumination of the light bulb.

The ground illuminator illuminates an area external to the rearview mirror, and comprises the housing enclosing the light source, the housing having an opening through which light from the light source is emitted, the primary lens is in register with the opening and positioned to transmit light from the light source, and the secondary lens is also in register with the opening in the housing and positioned between the light source and the primary lens, the secondary lens further comprising a thermal protector to minimize the heat generated by the light source from being directly transmitted to the primary lens. The secondary lens comprises a first surface and an opposed second surface, wherein the first surface is adapted to be fit into the opening in the housing and the second surface is adapted to be mounted to the primary lens.

The first surface of the secondary lens can comprise at least one depending flange formed closely in size to the size of the opening in the housing for press-fit engagement therewith. The opposed second surface of the secondary lens can comprise at least one spacer flange extending therefrom.

The primary lens can abut the at least one spacer flange on the opposed second surface of the secondary lens forming a gap between the primary lens and the secondary lens, whereby the thermal protection afforded by the secondary lens with respect to the primary lens is accomplished by the interposition of the gap therebetween.

The ground illuminator can further comprise at least one mounting leg on one of the primary lens and the secondary lens and at least one mounting recess on the other of the primary lens and the secondary lens aligned with the at least one mounting leg, wherein the primary lens is mounted to the secondary lens by insertion of the at least one mounting leg into the aligned at least one mounting recess.

The ground illuminator can further comprise a reflector to direct light from the light source through the primary lens via the secondary lens. The ground illuminator can be mounted in a lower portion of the rearview mirror to illuminate an area of ground below the rearview mirror. The primary lens can be convex or a fresnel lens. The thermal protector can comprise an air gap defined between the primary and secondary lenses. The primary lens can comprise a convex portion, and the thermal protector can comprise a gap located between the secondary lens and the convex portion of the primary lens.

DESCRIPTION OF AN EMBODIMENT OF THE INVENTION

Figure 1:
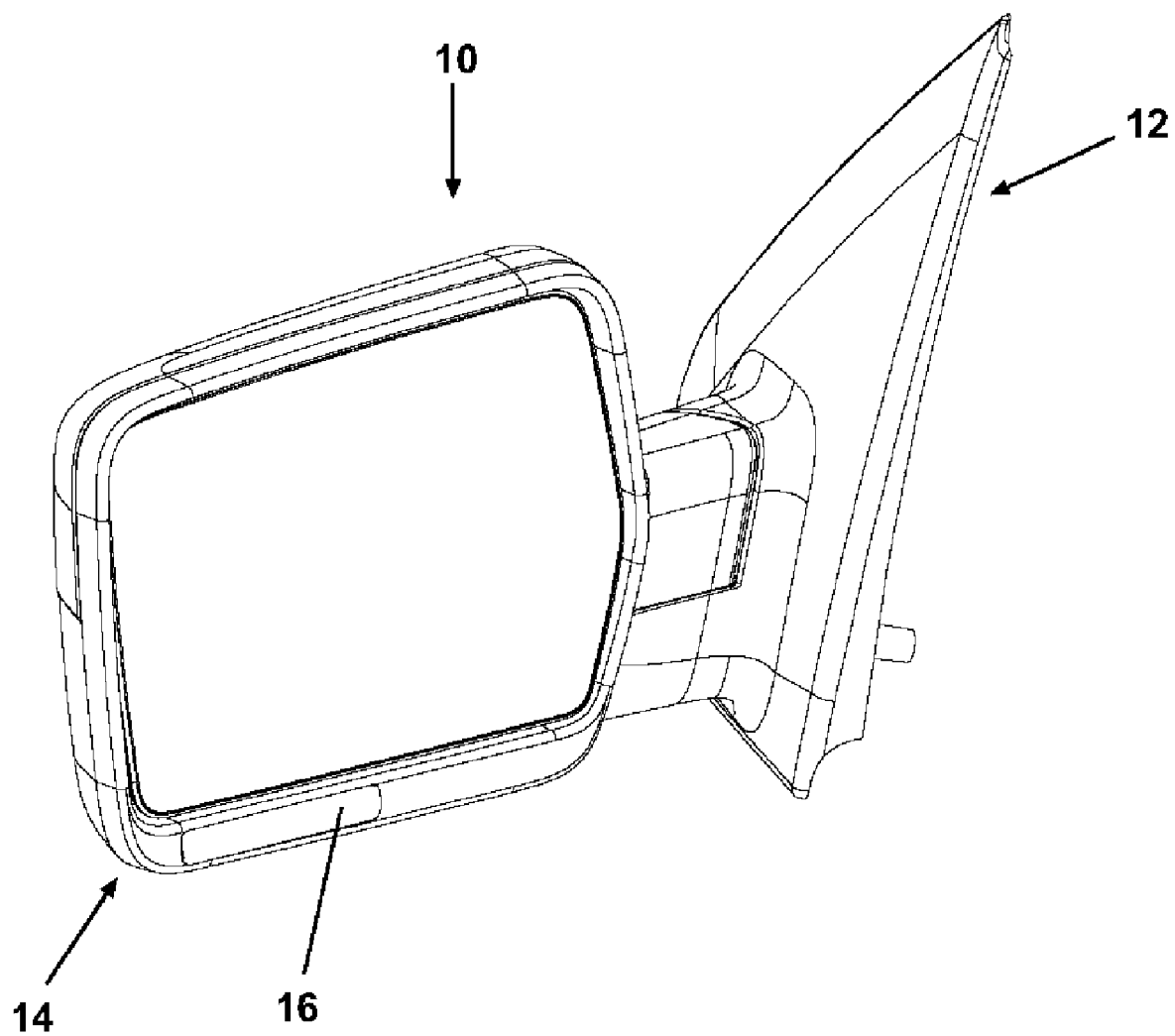
FIG. 1 is a first perspective view of an external rearview mirror for a motor vehicle comprising a light assembly according to the invention.

Referring now to the Figures, and particularly to FIG. 1, a rearview mirror assembly 10 for a motor vehicle (not shown) comprises a base assembly 12 adapted for mounting in a well-known manner to the side of the motor vehicle, a reflective element assembly 14 for providing a reflected image to the rear of the vehicle, and a housing 16 enclosing the reflective element assembly 14.

Figure 2:
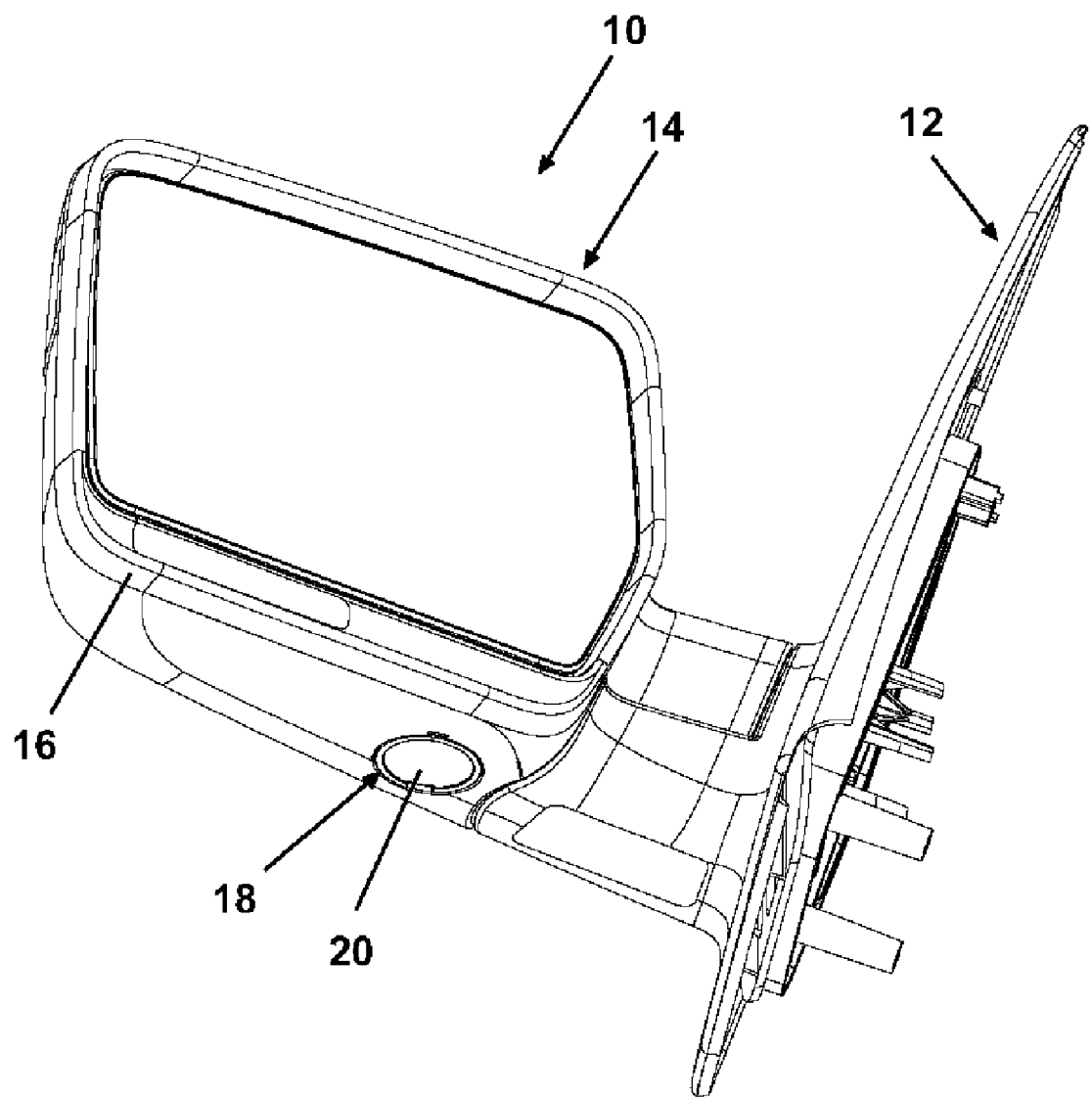
FIG. 2 is a second perspective view showing the underside of the external rearview mirror illustrated in FIG. 1.

Referring now to FIG. 2, the rearview mirror assembly 10 is provided with a ground illuminator 18 according to the invention, installed in a lower portion of the housing 16 for illuminating an area beneath the rearview mirror assembly 10 and adjacent the motor vehicle. The ground illuminator 18 comprises a primary lens which is preferably flush with the housing 16.

Figure 3:
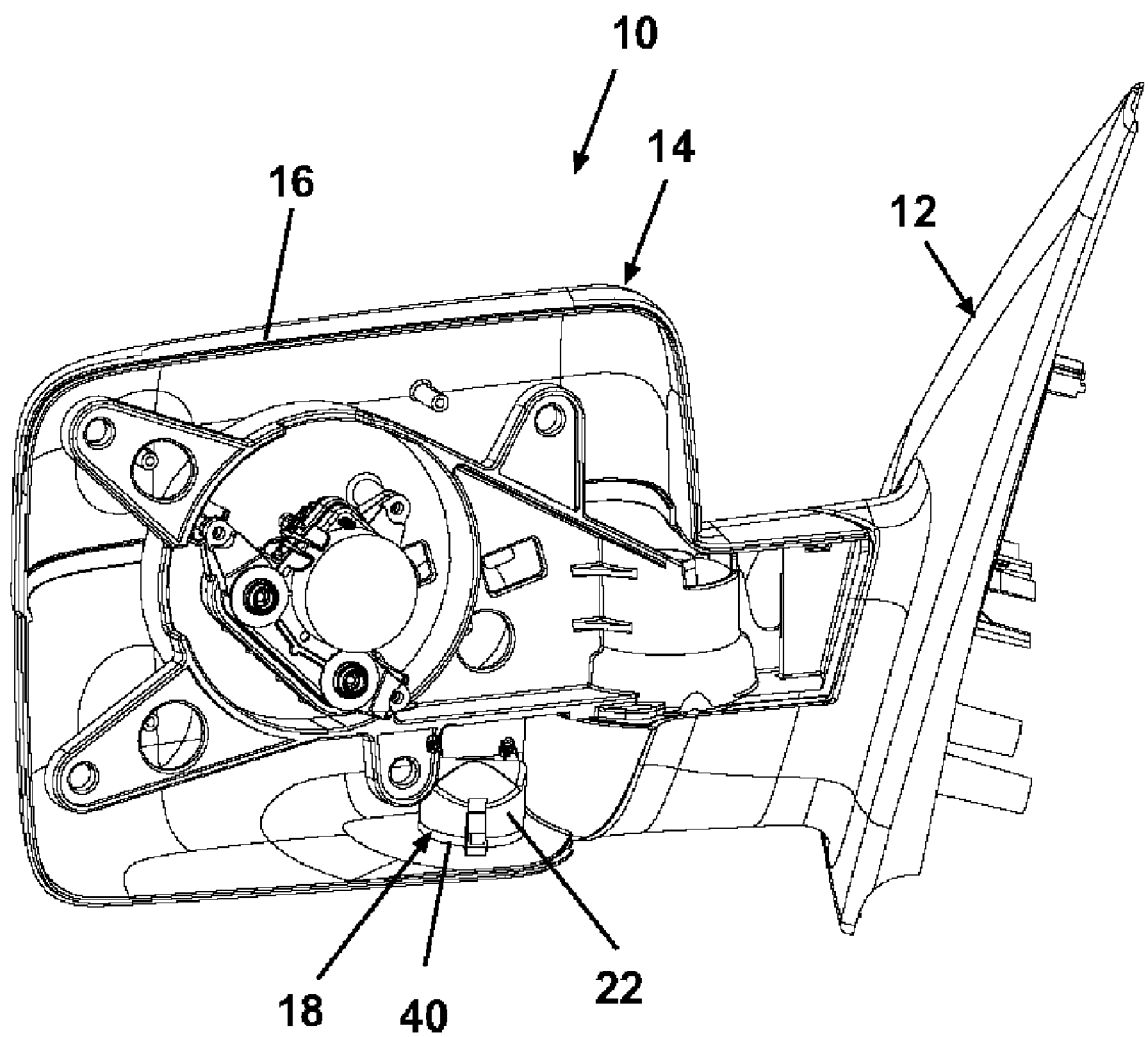
FIG. 3 is a perspective view of the interior of the external rearview mirror illustrated in FIG. 1 showing the light assembly.
Figure 4:
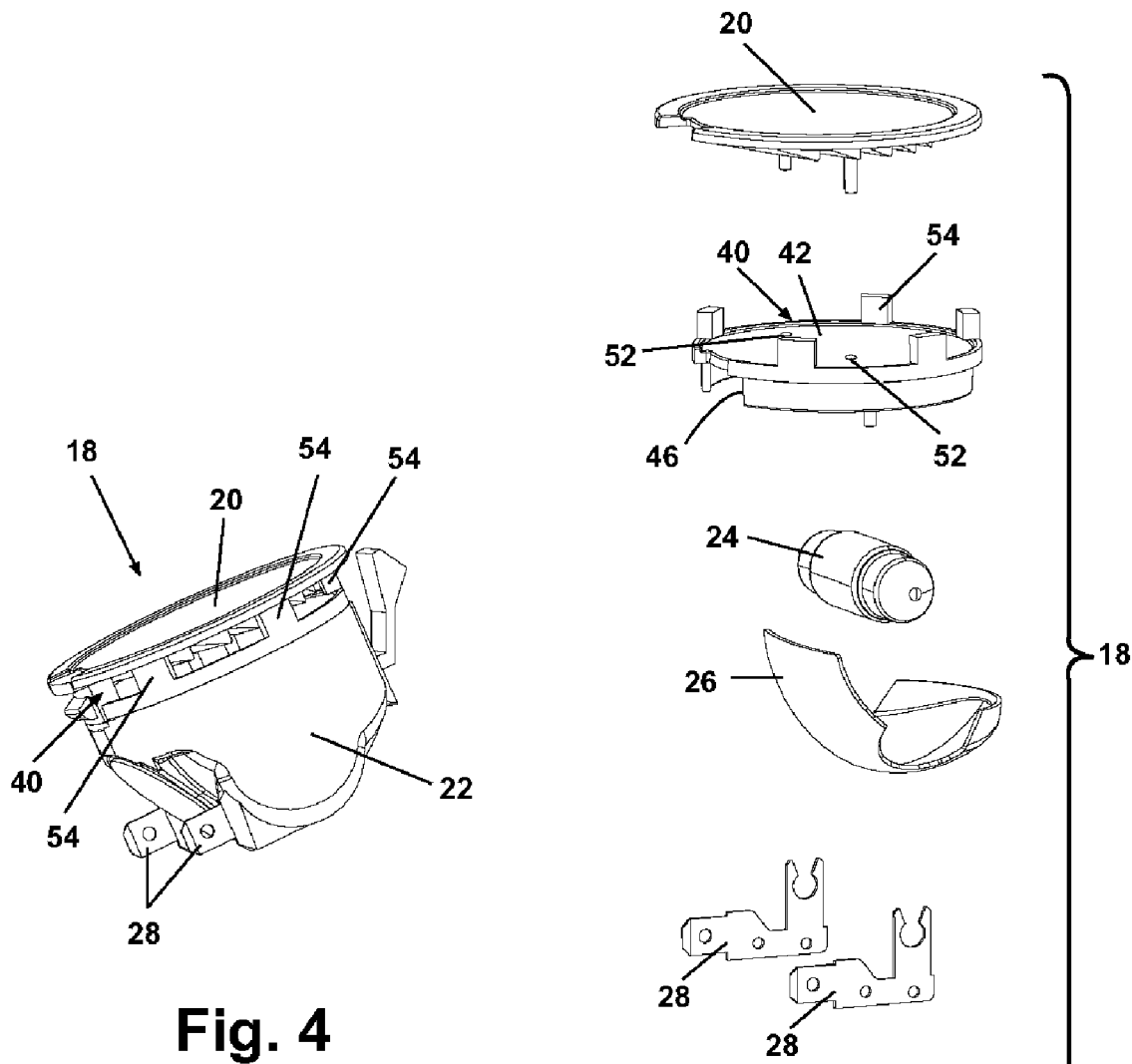
FIG. 4 is an enlarged perspective view of a first embodiment of the light assembly illustrated in FIG. 3.
Figure 5:
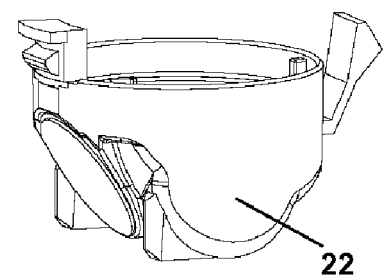
FIG. 5 is an exploded view of the light assembly illustrated in FIG. 4 showing a lens stack comprising a primary lens and a secondary lens.
Figures 6, 7:
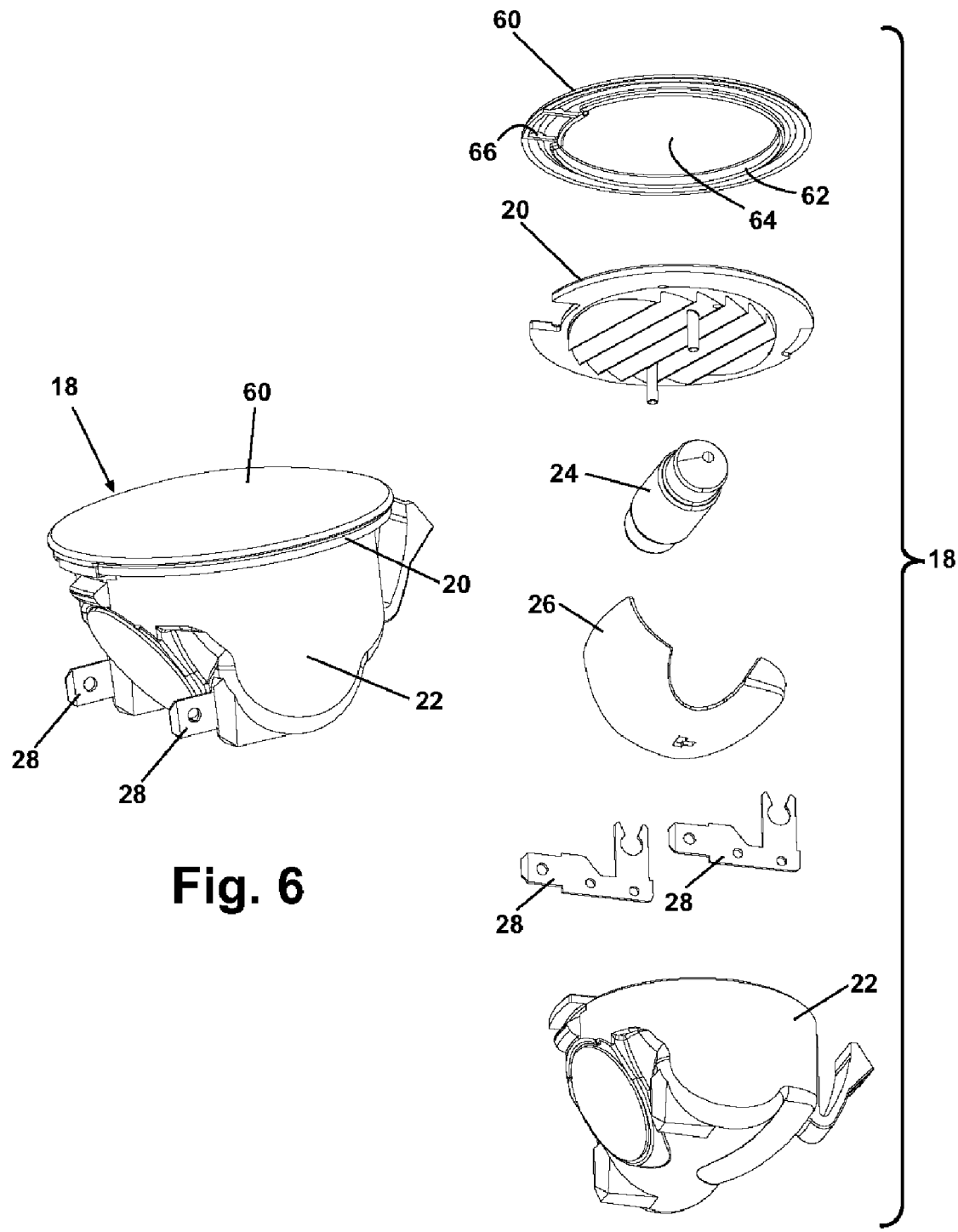
FIG. 6 is an enlarged perspective view of a second embodiment of the light assembly illustrated in FIG. 3.
FIG. 7 is an exploded view of the light assembly illustrated in FIG. 6 showing a lens stack comprising a primary lens and a secondary lens.

Referring now to FIGS. 3–5, a first embodiment of the ground illuminator 18 comprises a housing 22 enclosing an incandescent light bulb 24, a reflector 26, and a pair of power terminals providing power to and supporting the light bulb 24. The housing 22 is mounted in a suitable manner, such as with fasteners, interference fittings, friction fittings, and the like, to the mirror housing 16 at a lower portion thereof for directing light from the light bulb 24 to an area exterior of the rearview mirror assembly 10. A lens stack comprises a primary lens 20 and a secondary lens 40. The primary lens 20 protects the light bulb against impact, debris, and weather, and can be adapted to modulate the light provided by the light bulb 24, such as with a convex configuration 60, as illustrated in FIGS. 6 and 7, for magnifying the illumination. In the embodiment illustrated in FIG. 5, the primary lens 20 comprises a fresnel lens to direct the light in a particular region.

The ground illuminator 18 is provided with the secondary lens 40 interposed between the housing 22 and the primary lens 20. The secondary lens 40 is mounted to the housing 22 and supports the primary lens 20 in a nesting relationship.

Figure 8A:
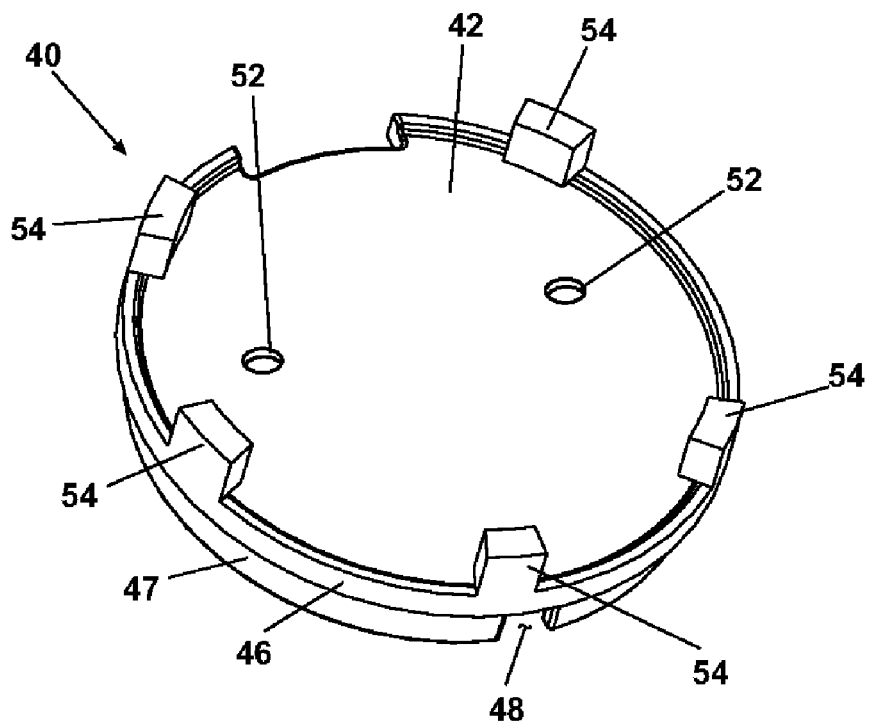
FIG. 8A is an enlarged perspective view of an obverse side of the secondary lens illustrated in FIG. 5.
Figure 8B:
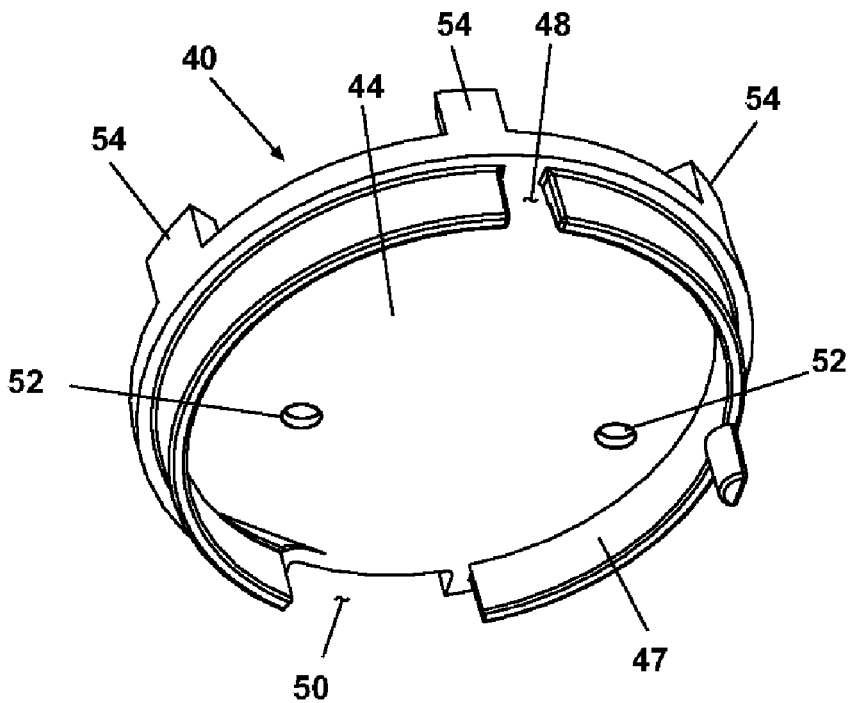
FIG. 8B is an enlarged perspective view of a reverse side of the secondary lens illustrated in FIG. 8A.

Referring to FIGS. 8A–B, the secondary lens 40 is a generally circular, plate-like body having an obverse side 42 which faces the primary lens 20 and a reverse side 44 which faces the housing 22 and the light bulb 24. A circumferential wall 46 extends longitudinally away from the obverse side 42 orthogonal thereto. A plurality of block-like spacers 54 extend in regularly-spaced relationship along the circumferential wall 46 longitudinally away from the obverse side 42. The spacers 54 are adapted for supporting the primary lens 20 along the circumference of the primary lens 20.

An annular wall 47 extends longitudinally away from the reverse side 44 orthogonal thereto, and is located somewhat radially inwardly from the circumference of the secondary lens 40. The curvature of the annular wall 47 is adapted for slidable register of the annular wall 47 with the inside circumference of the housing 22. The annular wall 47 is intersected by a first slot 48 and diametrically opposite the first slot 48 by a second slot 50. The second slot 50 is illustrated in FIG. 6B as somewhat wider than the first slot 48. The slots 48, 50 are adapted for cooperative register with mating detents (not shown) in the housing 22 for proper positioning and seating of the secondary lens 40 in the housing 22. A pair of apertures 52 extend through the secondary lens 40 between the obverse side 42 and the reverse side 44 for receiving mating pins (not shown) extending from the primary lens 20 for proper positioning and seating of the primary lens 20 against the secondary lens 40.

The light bulb 24, its position relative to the secondary lens 40, and the light transmission properties of the secondary lens 40 are selected in order to provide a preselected level of illumination.

The secondary lens 40 is attached to the housing 22 by slidably inserting the annular wall 47 into the housing 22 so that the rim of the housing 22 is in contact with the reverse side 44 along the circumference thereof. The secondary lens 40 can be attached to the housing 22 through a suitable means, such as one or more threaded or rivet-like fasteners, a friction fit, an interference fit, or the like. In a preferred embodiment, a sonic weld is used to attach the secondary lens 40 to the housing 22. The primary lens 20 is coaxially attached to the secondary lens 40 by inserting pins extending from the primary lens 20 into the apertures 52 so that the spacers 54 are in contact with the primary lens 20 along the circumference thereof to maintain the primary lens 20 a preselected distance away from the secondary lens 40. The primary lens 20 can be attached to the secondary lens 22 by a suitable means, such as an adhesive between the pins and the apertures 52, an adhesive between the spacers 54 and the primary lens 20, a friction fit of the pins in the apertures 52, and the like.

The assembled ground illuminator 18 is then installed in the housing 16 as illustrated in FIG. 3, and connected to the vehicle power supply through the power terminals 28. The ground illuminator 18 is operated in a well-known manner through suitable control connections between the ground illuminator 18 and a suitable vehicle control system.

The secondary lens 40 reduces heat transfer to the primary lens 20 from the light bulb 24 by thermally isolating the primary lens 20 from the light bulb 24 through the interposition of the secondary lens 40 between the primary lens 20 and the light bulb 24, and the use of the spacers 54. The air gap resulting from the use of the spacers 54 provides an effective thermal insulation between the primary lens 20 and the secondary lens 40. An incandescent light bulb, with its economical cost and desirable illumination qualities, can be used in the ground illuminator 18 while avoiding the safety problems associated with a primary lens heated to a high temperature by the light bulb. The use of the secondary lens 40 results in a reduction in the temperature of the primary lens 20 of approximately 50%. It has been observed that the temperature of the primary lens 20 is reduced from approximately 115° C. without the secondary lens 40 to approximately 60° C. (239° F.) with the secondary lens 40 (140° F.).

Referring again to FIGS. 6 and 7, a second embodiment comprising an alternate configuration of the lens stack is illustrated. In this embodiment, the secondary lens 40 is eliminated, and the primary lens 20 is mounted in the housing 22 adjacent the light bulb 24, thus serving as a secondary lens. An alternate primary lens 60 comprises a somewhat flattened, circular body having a ring flange 62 extending orthogonally away from the plane of the lens 60 along and adjacent the circumference of the lens 60. The ring flange 62 encloses a center convex portion 64 which is convex away from the light bulb 24 when assembled to the housing 22, thereby defining a space between the convex portion 64 and the lens 20. The ring flange 62 is interrupted by a gap 66.

The lens 20 is illustrated in FIG. 7 as a fresnel lens. The lens 20 is mounted in the housing 22 in a suitable, generally well-known manner, such as sonic welding or an adhesive, and the lens 60 is attached over and to the lens 20 in a suitable, generally well-known manner, such as sonic welding or an adhesive. An air space will be interposed between the lenses 20, 60, with air able to flow through the gap 66 into and from the air space. Separation of the convex portion 64 of the lens 60 from the lens 20 is sufficient to thermally isolate the lens 60 from the light bulb 24.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A ground illuminator mounted in a motor vehicle rearview mirror to illuminate an area external to the rearview mirror, the ground illuminator comprising:
    a housing enclosing a light source, the housing having an opening through which light from the light source is emitted;
    a primary lens in register with the opening and positioned to transmit light from the light source;
    a secondary lens also in register with the opening in the housing and positioned between the light source and the primary lens; at least one mounting leg on one of the primary lens and the secondary lens and at least one mounting recess on the other of the primary lens and the secondary lens aligned with the at least one mounting leg, wherein the primary lens is mounted to the secondary lens by insertion of the at least one mounting leg into the aligned at least one mounting recess and
    a thermal protector located between the primary lens and the secondary lens to minimize the heat generated by the light source from being directly transmitted to the primary lens.

2. The ground illuminator according to claim 1 wherein the secondary lens comprises a first surface and an opposed second surface, wherein the first surface is adapted to be fit into the opening in the housing and the second surface is adapted to be mounted to the primary lens.

3. The ground illuminator according to claim 2 wherein the first surface of the secondary lens comprises at least one depending flange formed closely in size to the size of the opening in the housing for press-fit engagement therewith.

4. The ground illuminator according to claim 3 wherein the opposed second surface of the secondary lens comprises at least one spacer flange extending therefrom.

5. The ground illuminator according to claim 4 wherein the thermal protector comprises an air gap formed by the abutment of the primary lens against the at least one spacer flange on the opposed second surface of the secondary lens, whereby the thermal protection afforded by the secondary lens with respect to the primary lens is accomplished by the interposition of the gap therebetween.

6. The ground illuminator according to claim 5, and further comprising a reflector to direct light from the light source through the primary lens via the secondary lens.

7. The ground illuminator according to claim 6, wherein the ground illuminator is mounted in a lower portion of the rearview mirror to illuminate an area of ground below the rearview mirror.

8. The ground illuminator according to claim 7, wherein the primary lens is convex.

9. The ground illuminator according to claim 7, wherein the primary lens is a fresnel lens.

10. The ground illuminator according to claim 1 wherein the secondary lens further comprises at least one depending flange formed closely in size to the size of the opening in the housing for press-fit engagement therewith.

11. The ground illuminator according to claim 1 wherein the secondary lens comprises at least one spacer flange extending therefrom.

12. The ground illuminator according to claim 11 wherein the primary lens abuts the at least one spacer flange on the secondary lens forming a gap between the primary lens and the secondary lens, whereby the thermal protection afforded by the secondary lens with respect to the primary lens is accomplished by the interposition of the gap therebetween.

13. The ground illuminator according to claim 1, and further comprising a reflector to direct light from the light source through the primary lens via the secondary lens.

14. The ground illuminator according to claim 1, wherein the ground illuminator is mounted in a lower portion of the rearview mirror to illuminate an area of ground below the rearview mirror.

15. The ground illuminator according to claim 1, wherein the primary lens is convex.

16. The ground illuminator according to claim 1, wherein the primary lens is a fresnel lens.

17. The ground illuminator according to claim 1, wherein the thermal protector comprises an air gap defined between the primary and secondary lens.

18. The ground illuminator according to claim 1, wherein the primary lens comprises a convex portion, and the thermal protector comprises a gap located between the secondary lens and the convex portion of the primary lens.

* * * * *